Sept. 1, 1931.    H. M. DIETZ ET AL    1,821,053
LICENSE PLATE HOLDER
Filed April 16, 1931
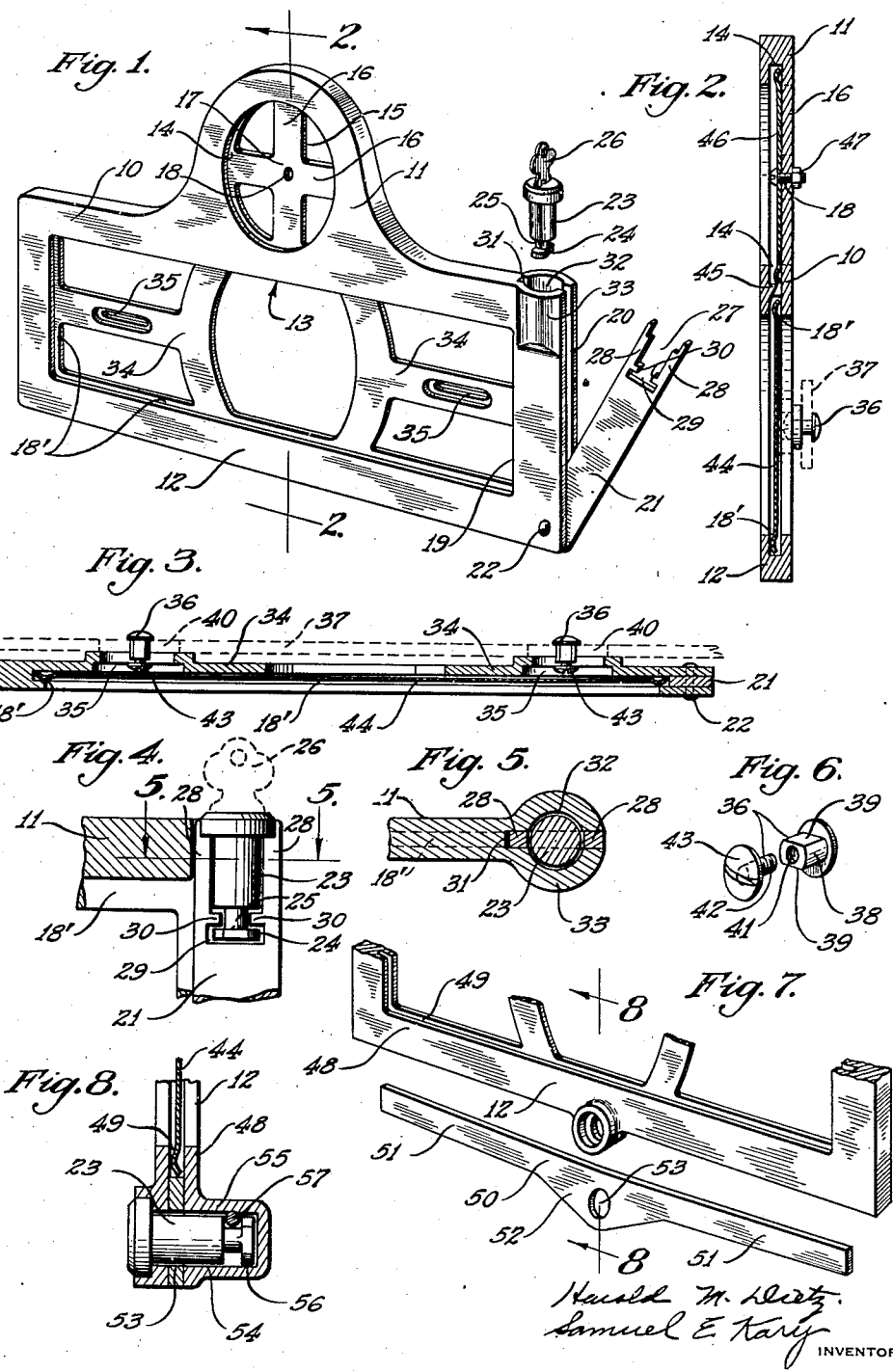

Patented Sept. 1, 1931

1,821,053

UNITED STATES PATENT OFFICE

HAROLD M. DIETZ AND SAMUEL E. KARY, OF CHICAGO, ILLINOIS

LICENSE PLATE HOLDER

Application filed April 16, 1931. Serial No. 530,570.

This invention relates to certain novel improvements in license plate holders, and has for its principal object the provision of an improved construction of this character which will be highly efficient in use and economical in manufacture.

Among the salient objects of this invention is to provide a holder of the class hereinafter described, formed to provide two frame structures, one of which is adapted to receive and support a license tag and the other being adapted to receive and support a license plate, and which frame members are so disposed with respect to each other that the removal of the tag necessitates first the removal of the license plate.

A still further object of the invention is to provide a holder of the class hereinafter described which is formed to provide two frame structures, one of which is adapted to receive and support a license tag and the other a license plate, and which holder has associated therewith a simple combination and arrangements of parts which will prevent unauthorized removal of the tag or plate.

A still further object of the invention is to provide a license plate holder which includes a frame structure arranged and adapted for the reception of a vehicle license plate which plate when mounted in the frame structure will conceal connecting elements connecting the holder to the usual supporting plate of a vehicle, and thus prevent unauthorized removal of the holder without first removing the license plate.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of our invention;

Fig. 2 is a sectional detail view taken substantially on line 2—2 of Fig. 1;

Fig. 3 is a transverse sectional detail view of the same;

Fig. 4 is a fragmentary sectional detail view of the locking structure embodied in our invention;

Fig. 5 is a fragmentary sectional detail view taken substantially on line 5—5 of Fig. 4;

Fig. 6 is a perspective view of connecting elements embodied in the invention;

Fig. 7 is a fragmentary perspective view of our invention illustrating a slightly modified form of construction; and Fig. 8 is a fragmentary sectional detail view taken substantially on line 8—8 of Fig. 7.

As heretofore indicated, it is one of the many objects of our invention to provide a holder for a license plate and tag whereby the license plate and tag cannot be removed by an unauthorized person. To accomplish this and other objects of our invention we provide a body 10 which includes two frame members 11 and 12 disposed with respect to each other as to have communication at a point indicated at 13 for reasons hereinafter set forth. The frame structure 11 in the present instance is substantially circular in plan view and provides a substantially circular channel 14 which receive the edge portions of a license tag. This frame structure is provided with a web 15 comprising two integral bars 16 arranged substantially at right-angles with respect to each other to provide a centrally located bearing portion 17 in which is provided a thread bearing opening 18 adapted to receive a connecting bolt whereby to connect the tag to the web when the tag is mounted in this frame structure.

The frame structure 12 provides on three frame members thereof channels 18' which are adapted to receive the edge portion of a license plate. The other remaining frame member 19 of this frame 12 is provided with an open slot 20 adapted to be obstructed by a bar 21 pivotally connected to the one of the frame members 12 by means of a non-movable pintle 22. This bar 21 is normally locked in slot obstructing position by means of a lock structure which will now be briefly described.

In connection with this lock structure it is pointed out that any suitable type of lock structure may be employed, but for the purpose of illustrating our invention, we have shown a conventional form of lock structure which includes a cylinder 23 having a lock head 24 rotatable with a barrel 25 by means of a suitable key 26.

The upper end portion of the bar 21 is formed to provide oppositely disposed arms 28 and an elongated slot 29 extending transversely of the bar 21 beneath keeper fingers 30. This bar 21 when mounted in slot obstructing position will dispose one of the arms 28 in a groove 31 formed in the frame structure 12. When the cylinder 23 is mounted in an opening 32 provided in a boss 33 formed on the frame structure 12, the arms 28 will be disposed on opposite sides thereof, thereby holding the bar in slot obstructing position. By rotating the key the barrel 23 will be rotated to rotate the head 24 to dispose the head 24 in the slot 29 beneath the keeper fingers 30, thus completing a locked connection between the bar and the frame 12 with the bar in slot obstructing position.

The frame 12 has formed integrally therewith a web 34 providing elongated slots 35 through which connecting elements 36 are adapted to be projected for connecting the frame to a fixed support 37 which support is fixed to the body of an automobile or the like. These connecting elements each include a stud 38 having oppositely arranged flat sides 39 adapted to project through slots 40 formed in the fixed support 37. These flat sides prevent the stud 38 from rotating. The stud is provided with a thread bearing opening 41 to receive the threaded shank 42 of a screw 43, the head of which bears against the web 34 whereby to complete connection between the body 10 and the fixed support 37.

It will be seen that when the license plate 44 is mounted in the frame 12 the screws 43 will be concealed and thus these screws cannot be removed until the license plate is removed from the holder.

Formed as a part of the frame 11 is a seat 45 which is adapted to provide a support for the license tag 46 mounted in the frame 11 to facilitate mounting this tag in this frame while connecting the tag to the body 10 by means of the connecting element 47 which is projected through the opening 18.

In Figs. 7 and 8 we have shown a slightly modified form of construction, in that the lower edge 48 of the frame 12 is provided with the open slot 49, and mounted in this slot to obstruct passage therethrough is a bar 50 having arms 51 which taper upwardly and outwardly whereby to wedge the license plate 44 in the frame 12 when this bar 50 is mounted in slot obstructing position. This bar 50 is provided with an extension 52 having an opening 53 formed therein which is adapted to register with an opening 54 formed in a boss 55 provided by the edge 48 of the frame 12. In this form of construction the cylinder 23 of the lock structure will be projected into the opening 54 through the opening 53 with its lock head 56 disposed to the rear of a suitable keeper pin 57 fixed within the boss 55 as shown in Fig. 8.

From the description herein taken in connection with the accompanying drawings, it is apparent that when the license plate is mounted in the frame 12, the connecting elements connecting the body 10 to the fixed support 37 are concealed, and thereby cannot be removed to permit unauthorized removal of the holder. Also that the license tag 46 cannot be removed until the plate 44 is removed.

In use where only the license plate is necessary, the frame 11 may be dispensed with.

The body 10 may be of any conventional shape or design to accommodate any conventional shape of a license plate or tag.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A license plate holder comprising a substantially rectangular frame structure providing channels along three frame members thereof adapted to receive the edge portions of a license plate and having an open slot provided by the remaining frame member thereof, a member adapted to removably engage in said slot to obstruct passage therethrough when said plate is mounted in said frame structure, a web provided by the frame structure and disposed to the rear of said plate when said plate is mounted in said frame structure and having slots formed therein for the passage of connecting elements whereby to connect said frame structure to a fixed support, and means for removably connecting said member to said frame structure in slot obstructing position.

2. A license plate holder comprising a frame structure providing channels along three frame members thereof adapted to receive the edge portion of a license plate and having an open slot provided by the remaining frame member thereof, a member adapted to removably engage in said slot to obstruct passage therethrough, means for pivotally connecting one end of said member to said frame structure, a web provided by the frame structure and disposed to the rear of said plate when said plate is mounted in said frame structure and having slots formed therein for the passage of connecting elements whereby to connect said frame structure to a fixed support, and a lock structure for removably connecting said member to said frame in slot obstructing position.

3. A license plate holder comprising two frame structures formed as a unitary structure and having a passage therebetween and each providing channels for the reception of the edge portions of a license plate, one of said frame structures having one edge provided with an open slot for the successive passage of said license plates into their respective frame structures, a member adapted to be positioned in said slot to obstruct passage therethrough, means for connecting one of the license plates to one of said frame structures, and means for connecting said frame structures to a fixed support, said means being disposed to the rear of the license plate mounted in the other of said frame structures.

4. A license plate holder comprising two frame structures having an unobstructed passage therebetween and each providing channels for the reception of the edge portions of a license plate, one of said frame structures having one edge provided with an open slot for the successive passage of said license plates into their repective frame structures, a member adapted to be positioned in said slot to obstruct passage therethrough, means for connecting one of the license plates within one of said frame structures, means for connecting said frame structures to a fixed support, said means being disposed to the rear of the license plate mounted in the other of said frame structures, and means for locking said member in slot obstructing position.

5. A license plate holder comprising a body providing two frame structures having open passage therebetween, one of said frame members being provided with an open slot common to each of the frame structures to facilitate mounting license plates in said frame structures, and a bar for obstructing passage through said slot.

6. A license plate holder comprising a body providing two frame structures having an open passage therebetween, one of said frame structures being provided with an open slot, a bar for obstructing passage through said slot, and a lock structure for locking said bar in slot obstructing position.

In testimony whereof we affix our signatures.

HAROLD M. DIETZ.
SAMUEL E. KARY.